US011928195B2

(12) United States Patent
Min et al.

(10) Patent No.: US 11,928,195 B2
(45) Date of Patent: Mar. 12, 2024

(54) APPARATUS AND METHOD FOR RECOGNIZING AN OBJECT IN ELECTRONIC DEVICE

(71) Applicant: Samsung Electronics Co., Ltd., Suwon-si (KR)

(72) Inventors: Hyunkee Min, Suwon-si (KR); Bokun Choi, Suwon-si (KR); Jongmu Choi, Suwon-si (KR); Sunkee Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 869 days.

(21) Appl. No.: 16/410,593

(22) Filed: May 13, 2019

(65) Prior Publication Data

US 2019/0354662 A1 Nov. 21, 2019

(30) Foreign Application Priority Data

May 15, 2018 (KR) .................. 10-2018-0055361

(51) Int. Cl.
*G06F 21/32* (2013.01)
*G01S 13/86* (2006.01)
(Continued)

(52) U.S. Cl.
CPC ............ *G06F 21/32* (2013.01); *G01S 13/867* (2013.01); *G06F 16/55* (2019.01); *G06V 10/454* (2022.01);
(Continued)

(58) Field of Classification Search
CPC ...... G06F 21/32; G06F 16/55; G06F 16/5854; G06F 2221/2111; G06F 1/1698;
(Continued)

(56) References Cited

U.S. PATENT DOCUMENTS 7,809,171 B2 * 10/2010 Solinsky .............. G06V 40/166
382/117
8,611,616 B1 * 12/2013 Ross ...................... G06V 40/16
382/103
(Continued)

FOREIGN PATENT DOCUMENTS

CN 1937955 A 3/2007
CN 103336950 A 10/2013
(Continued)

OTHER PUBLICATIONS

Korean Office Action dated Aug. 24, 2022, issued in Korean Patent Application No. 10-2018-0055361.
(Continued)

*Primary Examiner* — Tat C Chio
(74) *Attorney, Agent, or Firm* — Jefferson IP Law, LLP

(57) ABSTRACT

An electronic device is provided. The electronic device includes a housing including a first plate, a second plate, and a side member which surrounds a space between the first plate and the second plate, a display, an antenna array disposed in the housing or in part of the housing, an image sensor, a wireless communication device electrically coupled to the antenna array, a processor, and a memory. The memory may store instructions, when executed, causing the processor to obtain and receive at least one image using the image sensor, recognize an object in the at least one image, transmit a sequence of directional beams in at least one second direction, using the antenna array, receive a sequence of reflected waves reflected by the object, using the antenna array, and recognize the object, based at least in part on the recognized object and the sequence of the reflected waves.

12 Claims, 8 Drawing Sheets

(51) Int. Cl.
*G06F 16/55* (2019.01)
*G06V 10/44* (2022.01)
*G06V 10/764* (2022.01)
*G06V 10/82* (2022.01)
*G06V 40/16* (2022.01)
*G06V 40/40* (2022.01)

(52) U.S. Cl.
CPC ............ *G06V 10/764* (2022.01); *G06V 10/82* (2022.01); *G06V 40/165* (2022.01); *G06V 40/166* (2022.01); *G06V 40/172* (2022.01); *G06V 40/45* (2022.01)

(58) Field of Classification Search
CPC ........ G06F 21/45; G01S 13/867; G01S 7/006; G01S 13/88; G06V 40/165; G06V 40/166; G06V 10/454; G06V 10/764; G06V 10/82; G06V 40/172; G06V 40/45; G06V 40/16; G06K 9/6274; H04L 63/0861
See application file for complete search history.

(56) References Cited

U.S. PATENT DOCUMENTS

| | | | |
|---|---|---|---|
| 11,502,551 B2 * | 11/2022 | Leabman | A61B 8/56 |
| 2007/0030115 A1 | 2/2007 | Itsuji et al. | |
| 2010/0002912 A1 | 1/2010 | Solinsky | |
| 2011/0210885 A1 | 9/2011 | Lodwig et al. | |
| 2012/0314914 A1 | 12/2012 | Karakotsios et al. | |
| 2013/0328723 A1 | 12/2013 | Rappaport | |
| 2014/0016837 A1 * | 1/2014 | Nechyba | G06V 40/45 |
| | | | 382/118 |
| 2015/0262024 A1 | 9/2015 | Braithwaite et al. | |
| 2015/0347734 A1 | 12/2015 | Beigi | |
| 2016/0042169 A1 | 2/2016 | Polehn | |
| 2016/0371555 A1 | 12/2016 | Derakhshani et al. | |
| 2017/0124384 A1 | 5/2017 | Allyn | |
| 2017/0180348 A1 * | 6/2017 | Piccolotto | G06V 40/45 |
| 2018/0074600 A1 | 3/2018 | Park | |
| 2020/0019686 A1 | 1/2020 | Min et al. | |
| 2021/0105051 A1 | 4/2021 | Min et al. | |

FOREIGN PATENT DOCUMENTS

| | | |
|---|---|---|
| CN | 106355061 A | 1/2017 |
| CN | 106572268 A | 4/2017 |
| JP | 2007-241402 A | 9/2007 |
| JP | 2008-197713 A | 8/2008 |
| KR | 10-2013-0054767 A | 5/2013 |
| KR | 10-2016-0022541 A | 3/2016 |
| KR | 10-2018-0031240 A | 3/2018 |
| KR | 10-2019-0067052 A | 6/2019 |
| KR | 10-2020-0006757 A | 1/2020 |
| WO | 2018/079031 A | 5/2018 |

OTHER PUBLICATIONS

Korean Notice of Patent Grant dated Feb. 21, 2023, issued in a Korean Application No. 10-2018-0055361.
International Search Report dated Aug. 23, 2019, issued in the International Application No. PCT/KR2019/005725.
European Search Report dated Apr. 29, 2021, issued in European Application No. 19803458.9.
Chinese Office Action dated Nov. 7, 2023, Issued in Chinese Application No. 201980031863.6.

* cited by examiner

APPARATUS AND METHOD FOR RECOGNIZING AN OBJECT IN ELECTRONIC DEVICE

CROSS-REFERENCE TO RELATED APPLICATION(S)

This application is based on and claims priority under 35 U.S.C. § 119(a) to a Korean patent application number 10-2018-0055361, filed on May 15, 2018, in the Korean Intellectual Property Office, the disclosure of which is incorporated by reference herein in its entirety.

BACKGROUND

1. Field

The disclosure relates generally to an apparatus and a method for recognizing an object image in an electronic device. More particularly, the present disclosure relates to an apparatus and a method for recognizing an object image by combining outputs of a red, green, and blue (RGB) camera module and a wireless communication module.

2. Description of Related Art

As performance of an electronic device is improved, various services and additional functions provided through the electronic device are expanding. Various applications executable at the electronic device are under development to raise utility of the electronic device and to satisfy diverse demands of users.

Some of such applications are related to a camera function, and the user may capture his/her selfie or a background using a camera module of the electronic device. For example, the electronic device may perform a recognition function based on the object image captured using the camera module. For example, the object may be a face or an iris.

The above information is presented as background information only to assist with an understanding of the disclosure. No determination has been made, and no assertion is made, as to whether any of the above might be applicable as prior art with regard to the disclosure.

SUMMARY

A facial recognition algorithm mostly used at an electronic device may use a method for using an object image obtained at a red, green, and blue (RGB) camera, and a method for recognizing an object by combining an object image obtained at the RGB camera and depth information obtained at a depth camera. The method for using the object image obtained at the RGB camera may be vulnerable to a third party manipulation (e.g., a malicious spoofing attack using photos or smart phone images)). The method using the RGB camera and the depth camera requires a plurality of camera modules at the electronic device.

Aspects of the disclosure are to address at least the above-mentioned problems and/or disadvantages and to provide at least the advantages described below. Accordingly, an aspect of the disclosure is to provide an electronic device that may provide an apparatus and a method for recognizing an object image by combining outputs of an RGB camera module and a wireless communication module.

Another aspect of the disclosure is to provide an electronic device may provide an apparatus and a method for setting positions for recognizing an object based at least in part on an object to detect in an obtained object image, and transmitting a sequence of beams to the set positions.

Another aspect of the disclosure is to provide an electronic device may provide an apparatus and a method for recognizing an object based on characteristics of a sequence of beams reflected by a recognized object.

Additional aspects will be set forth in part in the description which follows and, in part, will be apparent from the description, or may be learned by practice of the presented embodiments.

In accordance with an aspect of the disclosure, an electronic device is provided. The electronic device includes a housing including a first plate which faces a first direction, a second plate which faces away from the first plate, and a side member which surrounds a space between the first plate and the second plate, a display viewed through a first portion of the first plate, an antenna array disposed in the housing or in part of the housing, an image sensor viewed through a second portion, which is close to the display, of the first plate and disposed to face the first direction, a wireless communication module electrically coupled to the antenna array and configured to form a directional beam using the antenna array, a processor disposed in the housing and operably coupled to the image sensor and the wireless communication module, and a memory operably coupled to the processor. According to various embodiments, the memory may store instructions, when executed, causing the processor to obtain and receive at least one image using the image sensor, recognize an object in the at least one image, transmit a sequence of directional beams in at least one second direction, using the antenna array, receive a sequence of reflected waves reflected by the object, using the antenna array, and recognize the object, based at least in part on the recognized object and the sequence of the reflected waves.

In accordance with another aspect of the disclosure, a method for recognizing an object in an electronic device is provided. The method includes obtaining at least one image using an image sensor, recognizing an object in the at least one image, transmitting a sequence of one or more directional beams in a direction of the object, using an antenna array disposed in a housing or in part of the housing, receiving a sequence of reflected waves reflected by the object, using the antenna array, and recognizing the object, based at least in part on the recognized object and the sequence of the reflected waves.

In accordance with another aspect of the disclosure, a method for recognizing a face in an electronic device is provided. The method includes obtaining at least one image using an image sensor, recognizing a face image in the at least one image, setting a liveness detection position of the face and a recognition position of the face based on the face image, transmitting a sequence of first directional beams to the liveness detection position, receiving a sequence of first reflected waves reflected at the liveness detection position, and detecting the liveness based on the sequence of the first reflected waves received, and transmitting a sequence of second directional beams to the recognition position of the face, receiving a sequence of second reflected waves reflected at the face recognition position, and recognizing the face based on the sequence of the second reflected waves received.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions or constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
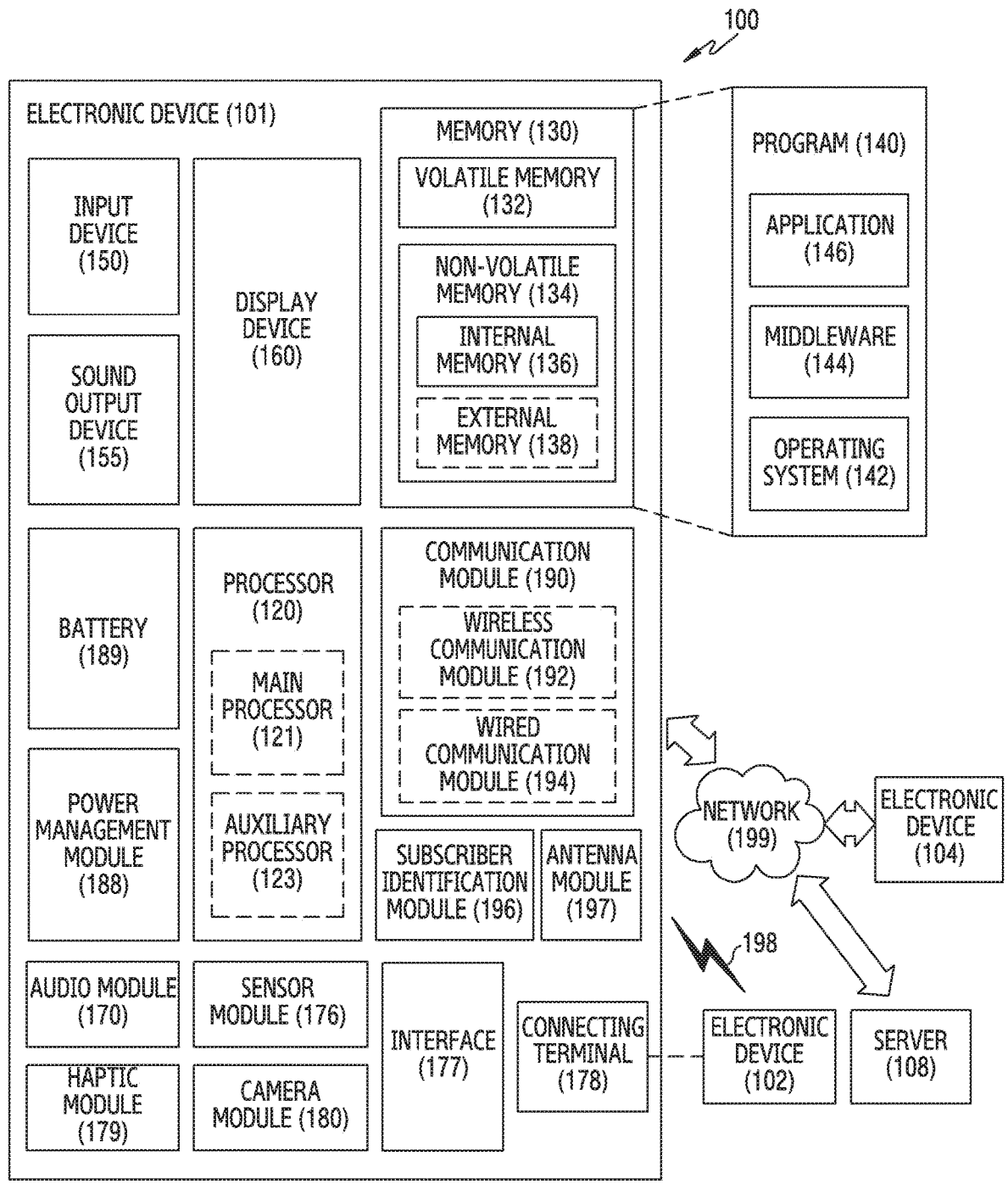
FIG. 1 is a block diagram of an electronic device in a network environment according to various embodiments of the disclosure.

FIG. 1 is a block diagram illustrating an electronic device in a network environment according to various embodiments of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, Wi-Fi direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
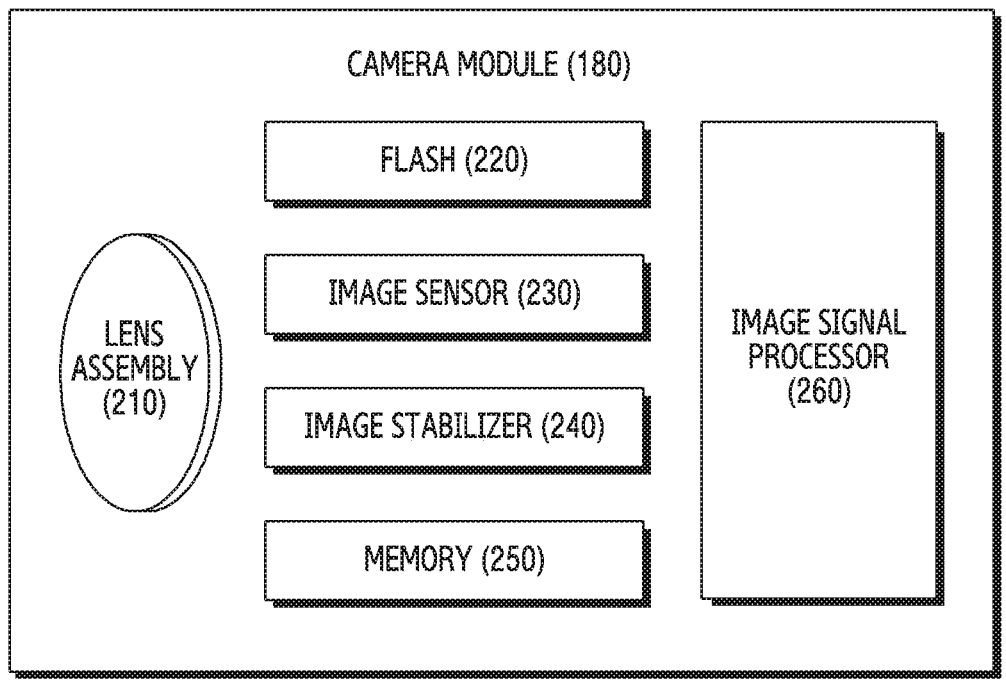
FIG. 2 is a block diagram of a camera module according to an embodiment of the disclosure.

FIG. 2 is a block diagram illustrating a camera module according to an embodiment of the disclosure.

Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a sensor module 176 (e.g., gyro sensor or an acceleration sensor) disposed inside or outside the camera module 180. According to an embodiment, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include at least one of, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance.

According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
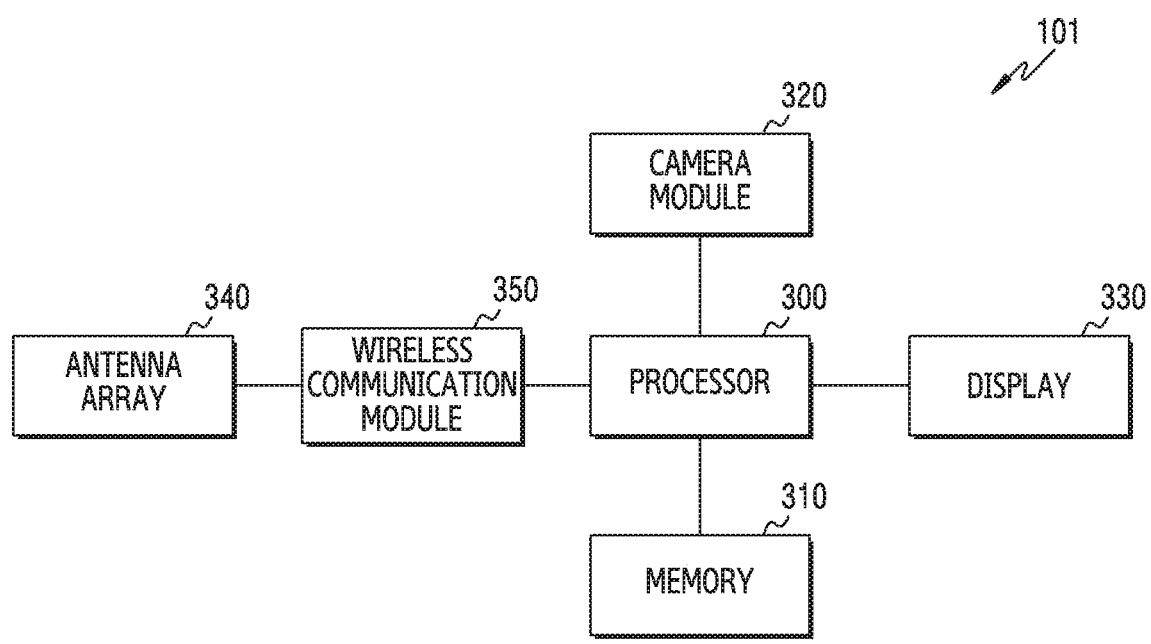
FIG. 3 is a block diagram of an electronic device according to an embodiment of the disclosure.

FIG. 3 is a block diagram of an electronic device according to an embodiment of the disclosure.

Referring to FIG. 3, the electronic device 101 may include a processor 300, a memory 310, a camera module 320, a display 330, an antenna array 340, and a wireless communication module 350.

The electronic device 101 may include a housing (not shown). The housing may include a first plate which faces a first direction, a second plate which faces away from the first plate, and a side member which surrounds a space between the first plate and the second plate.

The camera module 320 (e.g., the camera module 180 of FIG. 1 or FIG. 2) may include an image sensor (not shown, e.g., the image sensor 230 of FIG. 2) for generating pixel data by receiving visible light reflected by an object (e.g., face, iris, and the like). The camera module 320 may be viewed through a second portion of the first plate of the housing close to the display 330, and may be disposed to face the first direction.

The display 330 (e.g., the display device 160 of FIG. 1) may visually provide information (e.g., an image captured by the camera module 320) to outside of the electronic device 101. The display 330 may be viewed through the first portion of the first plate of the housing.

The antenna array 340 may be disposed in the housing and/or in part of the housing. The antenna array 340 may transmit a sequence of directional beams in at least one second direction via the selected antenna array. The wireless communication module 350 may be electrically coupled to the antenna array 340, and may be configured to form the directional beam using the antenna array. For example, the wireless communication module 350 may be a millimeter wave wireless communication module, and may be configured to transmit and/or receive frequencies of 3 GHz through 100 GHz.

The memory 310 (e.g., the memory 130 of FIG. 1) may store various data used by the processor 300. The memory 310 may store software (e.g., the program 140 of FIG. 1) for driving a learning engine to recognize a reflected wave received at the wireless communication module 350 and a learning engine to recognize an object image received from the camera module 320.

According to various embodiments, the memory 310 may store instructions for recognizing the object image obtained by the camera module 320, transmitting the sequence of the beams to a designated position of the recognized object, receiving the reflected waves of the sequence of the beams reflected by the object, and recognizing the object based at least in part on the recognized object image and the sequence of the received reflected waves. The instructions may cause the processor 300 to transmit the sequence of the beams after recognizing the object. The instructions may cause the processor 300 to determine a transmit direction of the sequence of the beams, based at least in part on the recognized object or a selected part of the recognized object. The instructions may cause to recognize the object by comparing the recognized object and a profile detected by the sequence of the reflected waves with a reference image and a reference profile. The instructions may cause the processor 300 to determine a distance between the object and the electronic device 101, based at least in part on the sequence of the reflected waves. The instructions may cause the processor 300 to recognize the object in a lock state of the electronic device 101, and if the object recognition is successful, to switch the lock state of the electronic device 101 to an unlock state.

According to various embodiments, the memory 310 may store at least one template generated by learning. For example, the templates may include at least one of a template for detecting presence of the object, a template for detecting liveness of the object, and a template for recognizing the object. According to various embodiments, the memory 310 may store position information for the presence, the liveness, and/or the object recognition in the identified object image.

The processor 300 (e.g., the processor 120 of FIG. 1) is disposed in the housing of the electronic device 101, and may be operably coupled to the camera module 320, the display 330, the wireless communication module 350, and the antenna array 340. The processor 300 may recognize the object according to the instructions stored in the memory 310. The processor 300 may obtain and receive at least one image through the camera module 320, and recognize the object in the received image. The processor 300 may transmit a sequence of directional beams in at least one second direction, and receive a sequence of reflected waves reflected by the object, using the antenna array 340. Based at least in part on the recognized object and the sequence of the reflected waves, the processor 300 may perform the object recognition.

According to various embodiments, the wireless communication module 350 may be a millimeter wave device. The millimeter wave device may transmit a millimeter wave signal toward the object in a direction corresponding to a particular pixel of image data using beamforming, and identify characteristics of a reflected signal by receiving the signal reflected by the object. To use the millimeter wave electronic device 101 in the object recognition, it is necessary to select a necessary part of the object and to extract object information reflected by transmitting the millimeter wave toward the selected object part. The electronic device 101 may enhance security of the object recognition by adding unique signal characteristics of the millimeter wave device to the object recognition. According to various embodiments, the electronic device 101 may shorten millimeter wave image data creation time by optimizing the selection of the object part (e.g., a specific position of the object based on the image data) to beamform at the millimeter wave device using the image data of the RGB camera, and thus reduce total processing time of the object recognition system.

The electronic device 101 may perform the recognition to execute a set function by obtaining an object (e.g., face) image. The user may capture a face by driving the camera module 320. The processor 300 may obtain the image including the face from the camera module 320, and recognize a face portion in the obtained image. The processor 300 may extract features of a main portion of the face from the recognized face image. The main portion of the face may be a portion for detecting presence of the face or liveness of the face, or for recognizing the face. The processor 300 may transmit the millimeter wave by generating a sequence of beams in a direction corresponding to the extracted face portion using the wireless communication module 350 and the antenna array 340. The processor 300 may receive the sequence of the beams reflected by the face using the wireless communication module 350 and the antenna array 340. The processor 300 may learn information of the main portions of the face using deep learning, artificial neural network, or deep neural network. The memory 310 may store the learned information for the main portions of the face. If receiving reflected wave information of the main portions of the face from the wireless communication module 350, the processor 300 may identify an output of a deep learning system which matches the features of the main portion of the face stored in the memory 310 with features based on the received reflected wave information, and identify whether the output corresponds to the user's face.

According to various embodiments, the electronic device 101 may use the machine learning engine for the face image recognition and the reflected wave recognition as one machine learning engine. According to one embodiment, the electronic device 101 may separately use the machine learning engine for the face image recognition and the machine learning engine for the reflected wave.

In one embodiment, the processor 300 may recognize the face portion in the image data obtained at and received from the camera module 320, and set recognition positions for recognizing the face in the recognized face image. The processor 300 may beamform and transmit the millimeter wave to the recognition position using the antenna array 340, receive the millimeter wave reflected by the face, and thus recognize whether it corresponds to the set user face. The face recognition may be performed based on a deep learning algorithm In one embodiment, the processor 300 may recognize the face portion in the image data obtained and received from the camera module 320, and set a liveness detection position for detecting the liveness of the face and recognition positions for recognizing the face in the recognized face image. For example, the position may be a specific portion, such as eye, noise, lip, or a portion which effectively represents the features of the user. The designated position may be changed based on information (e.g., face angle) of the image data. For example, the liveness detection position may be a specific portion, such as eye, nose, lip, for detecting micro movement of the user. For example, the recognition position may be the whole face region or the positions of the eye, the nose, and the lip for specifying the user face.

The processor 300 may detect the liveness of the face by beamforming and transmitting millimeter wave to the liveness detection position and receiving the millimeter wave reflected by the face. For example, the processor 300 may identify whether it corresponds to the set user face, by beamforming and transmitting the millimeter wave to the recognition position and receiving the millimeter wave reflected by the face. The liveness detection and the face recognition may be performed based on the deep learning algorithm.

In one embodiment, the processor 300 may recognize the face portion in the image data obtained and received from the camera module 320, and set a presence detection position for detecting the presence of the face, the liveness detection position for detecting the liveness of the face, and the recognition positions for recognizing the face in the recognized face image. The processor 300 may detect the presence of the face by beamforming and transmitting millimeter wave to the set presence detection position and receiving the millimeter wave reflected by the face. The processor 300 may detect the liveness of the face by beamforming and transmitting millimeter wave to the set liveness detection position and receiving the millimeter wave reflected by the face. The processor 300 may recognize whether it corresponds to the set user face, by beamforming and transmitting millimeter wave to the set recognition position and receiving the millimeter wave reflected by the face. According to one embodiment, the presence and liveness detection and the face recognition may be performed based on the deep learning algorithm According to various embodiments, the electronic device 101 may recognize the face using the camera module 320 including the RGB camera, the antenna array 340, and the wireless communication module 350. The electronic device 101 may perform face detection and/or facial feature or facial landmark detection based on the image obtained from the camera module 320. The electronic device 101 may determine a direction (a pixel or pixels to beamform in the image) of the sequence of the beams based on facial feature information, and the wireless communication module 350 may transmit the sequence of the beams in the set direction via the antenna array 340. The wireless communication module 350 may receive a signal reflected by the object (face), forward signal information to the processor 300, and recognize the face using the reflected signals and the learned information of the main portions of the face stored in the memory 310.

According to various embodiments, if a face recognition application is executed, the electronic device 101 may display a guide message notifying the execution of the face recognition. For example, to obtain a high quality image, the electronic device 101 may guide to take a picture at a specific distance in the camera module 320 using the display 330 and/or a speaker (not shown).

According to various embodiments, the electronic device 101 may obtain and receive the image using the camera module 320, and identify pixels corresponding to the face portion in the received image. The processor 300 may identify pixels for portions of facial landmarks in the identified face image. The facial landmark may be eyes, a nose, and/or lips. If necessary, the electronic device 101 may identify the landmarks in various types. For example, the electronic device 101 may identify a landmark (e.g., a central pixel position of the face image) for detecting the presence of the face, a landmark (e.g., a specific position of the face for detecting eye, nose, or lip movement) for detecting the face liveness, and positions (e.g., the whole region or part (e.g., a set including a plurality of landmarks of the eyes, the nose, and the lips) of the face) for recognizing the face, in the face image.

According to various embodiments, the electronic device 101 may select pixels corresponding to the recognized face image or pixels for the portions of the facial landmarks, and beamform the selected pixels using the wireless communication module 350 and the antenna array 340. The electronic device 101 may transmit the sequence of the beams in the set direction, and receive a signal reflected by the object (e.g., face) through the wireless communication module 350 and the antenna array 340. According to one embodiment, the wireless communication module 350 and the antenna array 340 may be millimeter wave devices, and may generate millimeter wave image data for the corresponding portion by transmitting and receiving the sequence of the beams in the direction of the selected pixels in the face image. For example, the electronic device 101 may use the millimeter wave image data to detect the liveness of the face image, thus utilize it in the face recognition.

If performing the beamforming to generate the millimeter wave image data for the selected pixels, the electronic device 101 may set azimuth and elevation values to generally set the beamforming direction.

Figure 4:
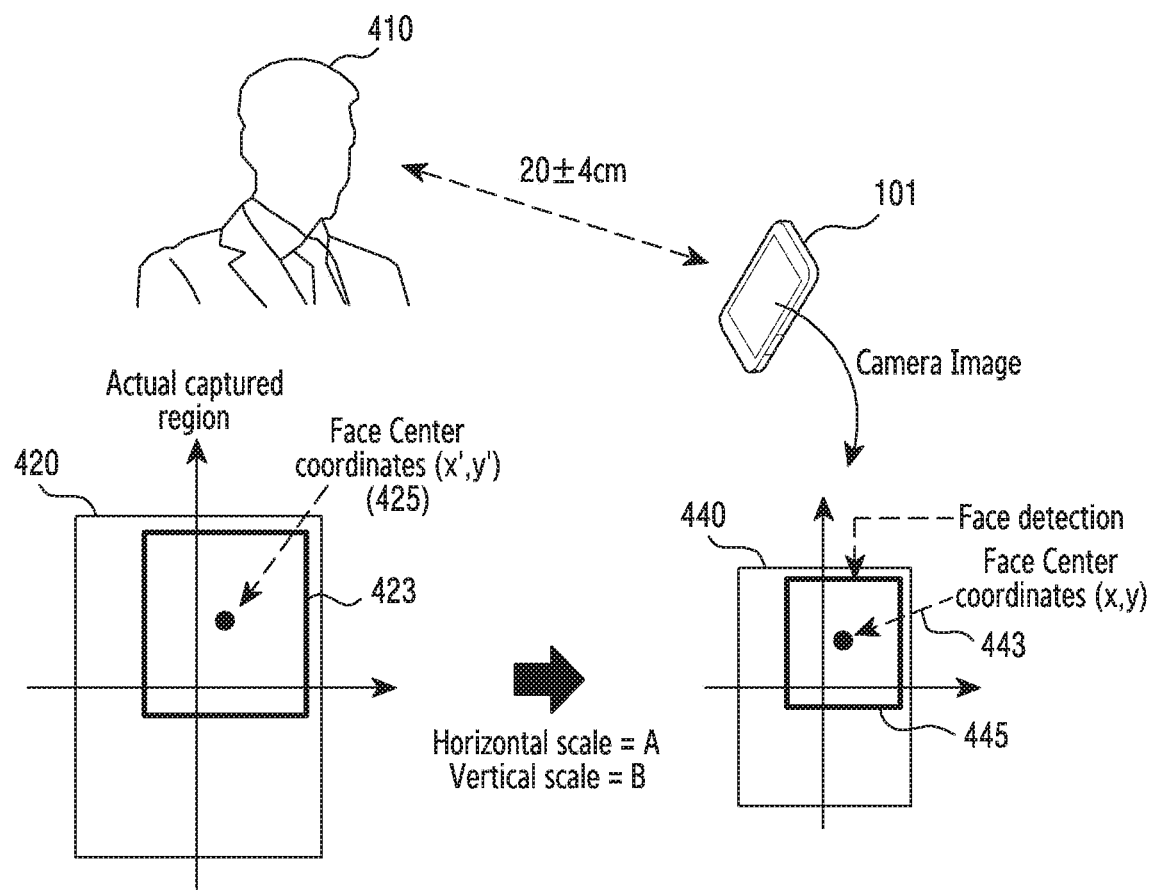
FIG. 4 is a diagram illustrating calculating coordinates of image data and a subject obtained at an electronic device according to an embodiment of the disclosure.

FIG. 4 is a diagram illustrating calculating coordinates of image data and a subject obtained at an electronic device 101 according to an embodiment of the disclosure.

Referring to FIG. 4, the electronic device 101 may perform the face recognition by capturing a subject 410. The electronic device 101 may obtain an image 440 of the subject 410 using the camera module 320, identify a face region 445 by recognizing the obtained image 440, and identify center coordinates 443 of the face region 445. An actual captured region 420 of the subject 410 and the image 440 obtained by the electronic device 101 may be different in size. Accordingly, center coordinates 425 of the face image 423 captured from the subject 410 and the center coordinates 443 of the face region 445 of the image 440 obtained at the electronic device 101 may differ.

Based on the image of the face region 445 of the obtained image 440, the electronic device 101 may transmit a sequence of beams to the subject 410. For example, the electronic device 101 may detect landmarks in the face region 445, and determine a direction of the sequence of the beams based on pixel information of the detected landmarks. Based on the center coordinates 443 (e.g., pixel position) of the image (e.g., the face region 445) obtained through the camera module 320, the electronic device 101 may estimate to match the face center coordinates 425 of the actual subject 410.

The electronic device 101 may obtain a high quality image if a specific distance is maintained between the subject 410 and the electronic device 101. For example, the electronic device 101 may guide an effective distance of the face recognition using a guide message if the face recognition application is executed. For example, the effective distance of the face recognition may be ±4 cm based on 20 cm which is the distance between the subject 410 and the electronic device 101. The electronic device 101 may precalculate a horizontal scale A and a vertical scale B based on a camera scale at the distance 20 cm. Hence, the center coordinates of the actual subject face may be inferred based on Equation 1.

$$x' = \frac{x}{A}, y' = \frac{y}{B} \qquad \text{Equation 1}$$

By using coordinates (pixel position) of the landmark portion in the image (e.g., the face region 445) in the same manner as in Equation 1, coordinates of the portion corresponding to the actual subject may be inferred. An RF location of the millimeter wave device may be preset to ($x_{mmWave}$, $y_{mmWave}$) and stored in the memory 310. For example, all of the coordinates of the image obtained at the camera module 320 may be assumed on the mm basis. Thus, if the subject is at the distance 20 cm from the electronic device 101, three-dimensional coordinates of the RF of the millimeter wave device may be (0, $x_{mmWave}$, $y_{mmWave}$) and three-dimensional center coordinates of the face of the actual subject may be (200, x', y'). In so doing, the azimuth and the elevation for the beamforming of the millimeter wave device may be estimated based on Equation 2.

$$\text{Azimuth} = \tan^{-1} \frac{x' - x_{mmWave}}{200}$$
$$\text{Elevation} = \tan^{-1} \frac{y' - y_{mmWave}}{200}$$

Equation 2

If obtaining the millimeter wave image data for the selected pixels of the face image using the wireless communication module 350, the electronic device 101 may perform the face recognition using the obtained millimeter wave image. The face recognition may further include the presence detection and/or the liveness detection. Using the wireless communication module 350 and the antenna array 340, the electronic device 101 may transmit to the subject the sequence of the beams for detecting the presence and/or the liveness and the sequence of the beams for the face recognition.

According to one embodiment, the signal reflected by the subject may include information based on the subject movement and face curves. For example, the subject movement may continuously fluctuate a phase and/or a time of flight (TOF) value for the reflected wave of the electronic device 101. The face curves of the subject may vary for each person, and the phase and/or the TOF value of the signal reflected by the face of the subject may have a different value per person. In addition, an amplitude reduction pattern may represent different unique characteristics from other object, according to a frequency for the reflected wave by human skin. The electronic device 101 may learn and store in the memory 310 the corresponding user's image and the reflected wave information (e.g., phase, TOF, amplitude, and the like) per user (e.g., the user who registers the image at the electronic device 101 for the face recognition).

According to various embodiments, the electronic device 101 may store the learned information (template) for the presence detection, the liveness detection, and the face recognition of the face, in the memory 310. The learned information for the face recognition may be generated using the deep learning, the deep neural network, or the artificial neural network, which may be conducted at the electronic device 101 or an external server. For example, the deep learning may employ a convolutional neural network (CNN) scheme. The learning using the CNN may perform the learning by inputting the user's face information to learn, into the CNN, and extract and store features based on the learned result as a template.

For example, the method for obtaining the learning information may input image information of particular portions which may be the facial landmarks of the eyes, the nose, and the lips obtained from at least one actual user face image and reception information (e.g., phase, TOF, amplitude obtained from the reflected wave of the beam 60 GHz) of the wireless communication module 350 for each specific portion to the CNN and calculate a corresponding output value as true, and input same parameters of general users and calculate a corresponding output value as false. The learning method using the CNN may repeat such calculations for a set number of times, update (update in a backpropagation method) an error occurring in the calculations, and generate and store in the memory a model (template) which makes the user's parameter true. The template may include a presence template, a liveness template, and a face recognition template. The presence template and the liveness template may be used for all of users, and the face recognition template may be a unique template generated in the training of the user images and the reflected waves.

Such a method may configure the template in advance using the parameters of the general users, and train the template in a transfer learning method which finely tunes using new user's parameter values.

The electronic device 101 may perform the face recognition by comparing the information of the image and the reflected waves received while executing the face recognition application, with corresponding information stored in the memory. In the recognition using the trained model, the electronic device 101 may perform the recognition by inputting the parameter values based on the image and the reflected wave received in real time as the input of the CNN. The electronic device 101 may determine an authorized user if the output of the CNN is true, and determine an unauthorized user if the output of the CNN is false.

Figure 5:
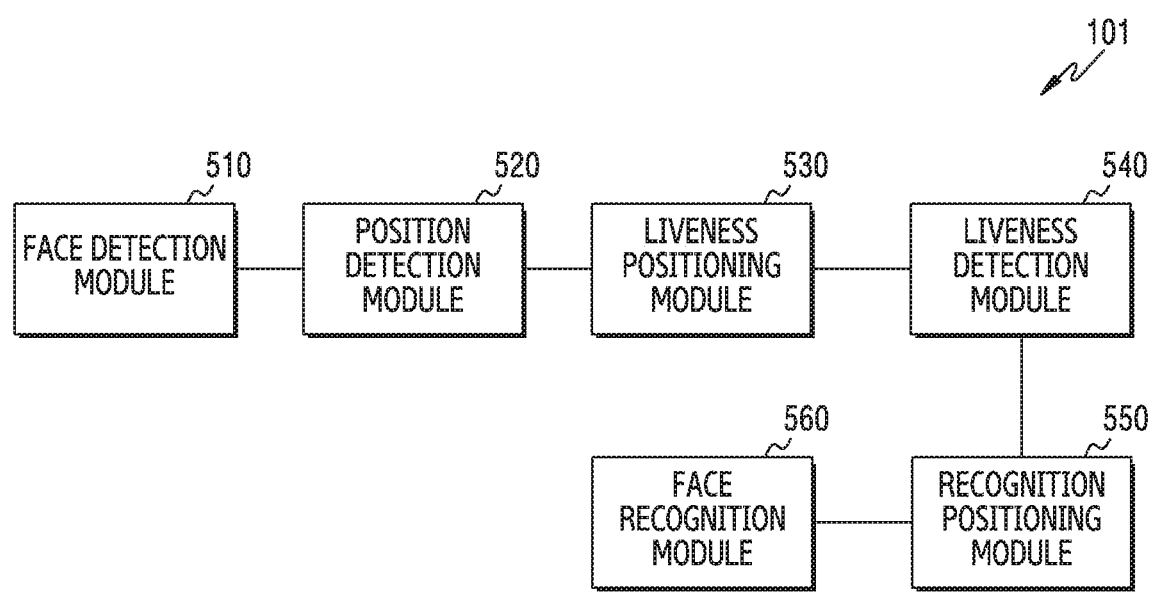
FIG. 5 is a block diagram of an electronic device according to an embodiment of the disclosure.

FIG. 5 is a block diagram of an electronic device according to an embodiment of the disclosure. FIG. 5 illustrates an example where the electronic device 101 detects liveness of an image obtained through the camera module 180 and recognizes a face based on the detected liveness.

Referring to FIG. 5, the electronic device (e.g., the electronic device 101 of FIG. 1) may include a face detection module 510, a position detection module 520, a liveness positioning module 530, a liveness detection module 540, a recognition positioning module 550, and a face recognition module 560. The configuration of the electronic device 101 of FIG. 5 may be a configuration of a processor (e.g., the processor 120 of FIG. 1, the processor 300 of FIG. 3).

The face detection module 510 may obtain image data from a camera module (e.g., the camera module 180 of FIG. 1, the camera module 320 of FIG. 2 and FIG. 3). The face detection module 510 may detect a face image in the obtained image. For example, to detect the face of various sizes, the face detection module 510 may generate a pyramid image from the obtained image, and determine whether a region of a specific size is the face or not using a classifier (e.g., adaptive boosting (AdaBoost)) while moving pixel by pixel.

The position detection module 520 may detect facial features or facial landmarks in the detected face image. According to various embodiments, the position detection module 520 may specify eyes, nose, and lips, and specify the face region. For example, the position detection module 520 may detect a position (e.g., the center of the image) for detecting the face presence in the face image, a position (e.g., a specific position of the face for detecting the eye, nose, and eye movement) for detecting the face liveness, and positions (e.g., the entire face region, or eye, nose, and lip positions for detecting the facial features) for recognizing the face.

The liveness positioning module 530 may select face positions (e.g., specific pixel positions of the face image) for detecting the face liveness, and beamform beams through the wireless communication module 350 and the antenna array 340 in order to transmit a sequence of the beams to the selected face position. The wireless communication module 350 and the antenna array 340 may transmit the sequence of the beams in a corresponding direction based on liveness beamforming information (e.g., azimuth and elevation) which is set at the liveness positioning module 530, and receive signals reflected by the subject.

The liveness detection module 540 may detect the face liveness based on the signal reflected by the subject and received at the antenna array 340. The liveness detection module 540 may calculate the TOF, the phase, and/or the amplitude of the reflected signal received, and detect the liveness based on the liveness template which stores the calculation information in the memory 310. The recognition positioning module 550 may select face positions (e.g., the entre face image region or a set of landmarks including a plurality of landmarks) for recognizing the face, and form beams to transmit a sequence of the beams to the selected positions. The wireless communication module 350 and the antenna array 340 may transmit the sequence of the beams in a corresponding direction based on beamforming information (e.g., azimuth and elevation) for the face recognition which is set at the recognition positioning module 550, and receive signals reflected by the subject.

The face recognition module 560 may recognize the face image based on the signal reflected by the subject and received at the antenna array 340. The face recognition module 560 may calculate the TOF, the phase, and/or the amplitude of the received reflected signal, and recognize the user's face image based on the face recognition template which store the calculation information in the memory 310. The liveness positioning module 530 may be positioned to measure micro movement of the object, and the liveness detection position may be used to measure a distance from the object. For example, the liveness detection position may be the face region or part of the face region. The face recognition module 560 may perform the face recognition with deep learning information based on object information (e.g., distance information from the object, TOF).

According to various embodiments, the electronic device 101 may detect the liveness of the face image obtained using the millimeter wave device, and recognize the face image if the liveness is detected. For example, even if the face of the person is motionless, micro-meter movement may continuously occur. Such movement may continuously fluctuate the phase or the TOF value with respect to the reflected wave of the millimeter wave device. The electronic device 101 may pre-store in the storage such movement characteristics in a specific pattern using the deep learning (or machine learning). The reflected wave from human skin may exhibit different characteristics from other object in the amplitude reduction pattern of the reflected wave according to the frequency. The electronic device 101 may also pre-store the amplitude reduction pattern of the reflected wave in the storage. The liveness positioning module 530 may perform the beamforming to transmit the sequence of the beams to the positions (e.g., the eye, nose, or lip positions of the face image) for detecting the liveness, and receive signals reflected by the face of the subject. The liveness detection module 540 may detect the liveness by comparing the phase or TOF pattern of the millimeter wave image data with the micro movement pattern of the face stored in the memory through the training or by comparing the amplitude reduction pattern based on the frequency of the reflected wave with a pre-stored human skin pattern.

According to various embodiments, if the electronic device 101 detects the liveness (e.g., it a condition of the liveness detection is satisfied, if the characteristics of the reflected wave are similar to the reflective wave pattern of the face of the person), the recognition positioning module 550 may perform additional beamforming toward the face position (the face region or part of the face including a plurality of landmarks in the face region) for the face recognition. The electronic device 101 may transmit the sequence of the beams to the face position of the subject for the additional face recognition, and receive a signal reflected by the corresponding face position of the subject. The face recognition module 560 may recognize the user's face based on the recognized face image, the sequence of the reflected waves, and the face recognition template stored in the memory.

In so doing, if the millimeter wave image data for detecting the liveness is enough to not only detect the liveness but also recognize the face, the electronic device 101 may not conduct the additional beamforming In this case, the recognition positioning module 550 may be omitted in FIG. 5.

In various embodiments, if separately using the beamforming for the face liveness detection and the beamforming for the face recognition, the electronic device 101 may perform the beamforming for the liveness detection on a specific part of the face, and if matching the specific part of the face, calculate a direction of other region based on the corresponding beam direction. If determining the beamforming direction of the millimeter wave device from pixel information of the face image obtained at the camera, the electronic device 101 may cause beamforming error according to the mounting positions of the camera module and the millimeter wave device or the distance between the user and the electronic device 101. Hence, the beamforming for the liveness detection may be used to locate the face of the user and to measure the distance between the electronic device 101 and the face by repeatedly beamforming a specific region.

According to various embodiments, if generating the millimeter wave image data, the electronic device 101 may compare with the data (template) generated by the training, through the feature extraction of the deep learning (e.g., CNN) algorithm, and determine success or failure of the face recognition by calculating a matching score according to a predefined algorithm If the face recognition is success or failure, the electronic device 101 may use the pre-stored template for the face as additional data for the continual updating according to a condition.

An electronic device 101 according to various embodiments may include a housing including a first plate which faces a first direction, a second plate which faces away from the first plate, and a side member which surrounds a space between the first plate and the second plate, a display 330 viewed through a first portion of the first plate, an antenna array 340 disposed in the housing and/or in part of the housing, an image sensor 230 viewed through a second portion, which is close to the display, of the first plate and disposed to face the first direction, a wireless communication module 350 electrically coupled to the antenna array and configured to form a directional beam using the antenna array, a processor 300 disposed in the housing and operably coupled to the image sensor and the wireless communication module, and a memory 310 operably coupled to the processor. The memory 310 may store instructions, when executed, causing the processor 300 to obtain and receive at least one image using the image sensor 230, recognize an object in the image, transmit a sequence of directional beams in at least one second direction, using the antenna array 340, receive a sequence of reflected waves reflected by the object, using the antenna array 340, and recognize the object, based at least in part on the recognized object and the sequence of the reflected waves.

According to various embodiments, the wireless communication module 350 may be configured to transmit and/or receive frequencies of 3 GHz through 100 GHz.

According to various embodiments, the instructions may cause the processor 300 to, after recognizing the object, transmit the sequence of the beams.

According to various embodiments, the object may include a face of a user.

According to various embodiments, the second direction may be the same as the first direction.

According to various embodiments, the instructions may cause the processor 300 to determine the second direction, based at least in part on the recognized object or a selected portion of the recognized object.

According to various embodiments, the memory 310 may store a reference image and a reference profile of an object based on a user, and the instructions may cause to perform the recognition by comparing the recognized object and a profile detected by the sequence of the reflected waves with the reference image and the reference profile.

According to various embodiments, the instructions may cause the processor 300 to determine a distance between the object and the electronic device, based at least in part on the sequence of the reflected waves.

According to various embodiments, the instructions may cause the processor 300 to perform the recognition while the electronic device 101 is locked, and if the recognition is successful, switch the lock state of the electronic device 101 to an unlock state.

Figure 6:
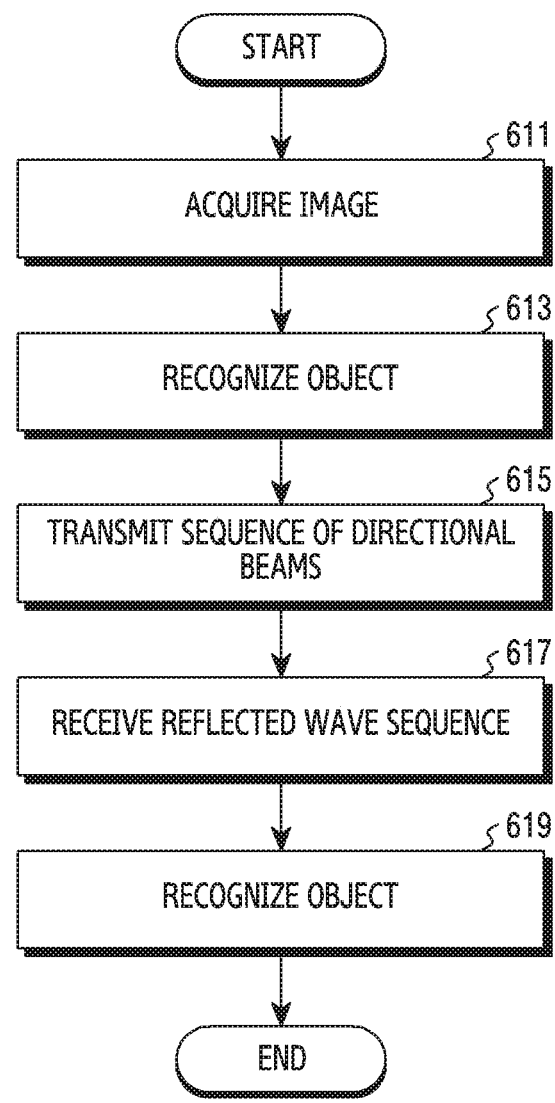
FIG. 6 is a flowchart of an object recognition method of an electronic device according to an embodiment of the disclosure.

FIG. 6 is a flowchart of an object recognition method of an electronic device according to an embodiment of the disclosure.

Referring to FIG. 6, the electronic device 101 may perform object recognition based on an object image and a millimeter wave signal based on a signal reflected by the object. The electronic device 101 may obtain a subject image through a camera module (e.g., the camera module 180 of FIG. 1, the camera module 320 of FIG. 2 and FIG. 3) in operation 611. In operation 613, the electronic device 101 may recognize an intended object region and main portions of the object in the obtained subject image, and detect landmarks for recognizing the object in the recognized object image.

In operation 615, the electronic device 101 may transmit a sequence of directional beams based on the detected object landmarks using a wireless communication module (e.g., the wireless communication module 350 and the antenna array 340 of FIG. 3). The electronic device 101 may form beams in a direction of the subject position corresponding to the detected landmark in the recognized object image, and the wireless communication module and the antenna array may transmit a sequence of the beams to the landmark positions of the subject. In operation 617, the electronic device 101 may receive a sequence of reflected waves reflected by the subject. In operation 619, the electronic device 101 may perform the object recognition based on the recognized object image and the sequence of the received reflected waves. For example, the object recognition may be performed by comparing the recognized object and a profile detected by the sequence of the reflected waves with a reference image and a reference profile.

According to various embodiments, the object may be a face of a person. The wireless communication module 350 and the antenna array 340 may be millimeter wave devices.

The millimeter wave device may transmit a signal to a specific position of the object using the beamforming, and the processor 300 may identify characteristics of a signal reflected by the object through the wireless communication module 350. For example, if recognizing the face using the millimeter wave device, image data generating time may be shortened by identifying information (e.g., eyes, nose, and lips of the face) of the necessary part in the face and transmitting the signal to the identified position using the beamforming For example, the electronic device 101 may detect the face liveness by transmitting a sequence of directional beams to specific positions (e.g., eyes, nose, and/or lips) of the face in the face recognition, and, if detecting the liveness, recognize the face by transmitting the sequence of the directional beams to the face region of the image.

Figure 7:
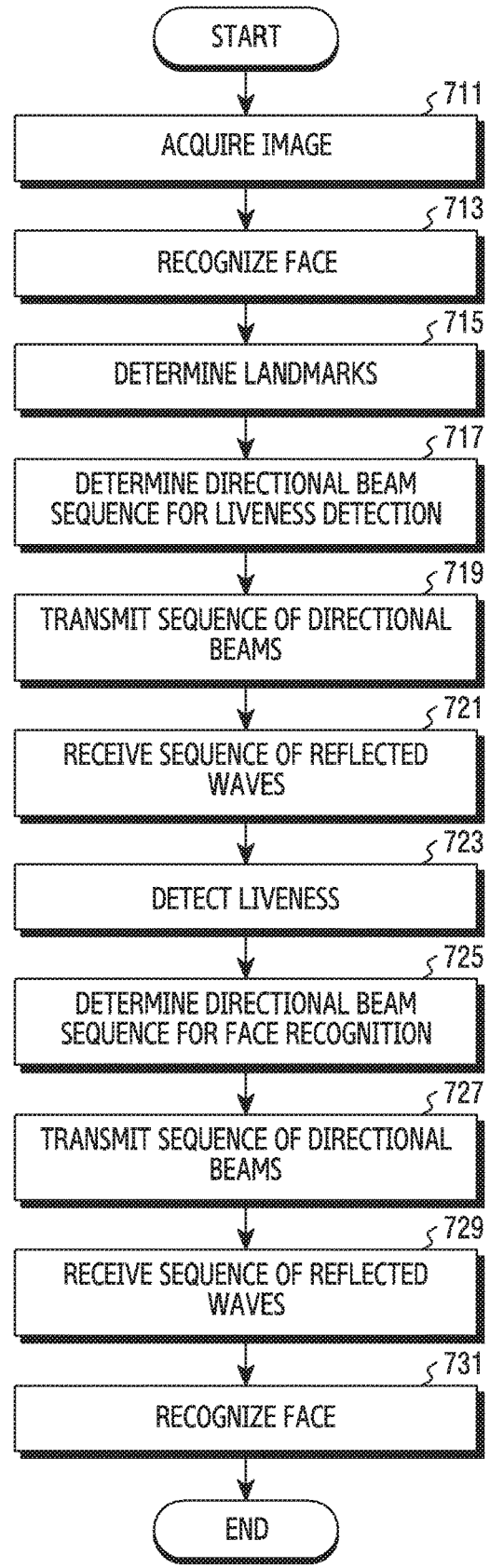
FIG. 7 is a flowchart of a method for recognizing a face in an electronic device according to an embodiment of the disclosure.

FIG. 7 is a flowchart of a method for recognizing a face in an electronic device according to various embodiments of the disclosure. FIG. 7 illustrates the flowchart of the electronic device 101 for calculating an azimuth and an elevation for beamforming of a millimeter wave device for each pixel of a face image, forming beams based on calculation results, and performing liveness detection and face recognition based on a signal reflected by a subject according to the beamforming.

Referring to FIG. 7, the electronic device (e.g., the electronic device 101 of FIG. 1) may perform the face recognition based on the face image and a millimeter wave image based on the signal reflected by the face. In operation 711, the electronic device 101 may obtain the image including the face through a camera module (e.g., the camera module 180 of FIG. 1, the camera module 320 of FIG. 2 and FIG. 3). In operation 713, the electronic device 101 may recognize a face region and main portions of the face in the obtained image. In operation 715, the electronic device 101 may detect landmarks for the face recognition in the recognized face image. The electronic device 101 may calculate coordinates of the face region or positions (e.g., pixel coordinates) of the portions which may be the landmarks of the face, in the image obtained through the camera module. The electronic device 101 may select a position for detecting face liveness and positions for recognizing the face. For example, the position for detecting the face liveness may select pixel coordinates of specific portions which may be the landmarks of eyes, noise, and lips in the face image, and the positions for recognizing the face may select a set of pixel coordinates collected from the whole face image within a limited time duration.

In operation 717, the electronic device 101 may calculate the azimuth and the elevation for the position of the face image for the face liveness detection. For example, the electronic device 101 may calculate the azimuth and the elevation of beams for the liveness detection by applying liveness detection position information to Equation 1 and Equation 2. In operation 719, the electronic device 101 may transmit a sequence of beams to the liveness detection position of the subject based on the calculated azimuth and elevation. In operation 721, the electronic device 101 may receive sequence reflected waves of the beams reflected by the subject. In operation 723, the electronic device 101 may calculate phase, TOF, and amplitude values from the received reflected waves, and detect the face liveness based on the calculated values. According to one embodiment, a memory (e.g., the memory 310 of FIG. 3) may store a liveness template for detecting the face liveness. For example, the liveness template may be a specific pattern value which trains phase, TOF, and amplitude changes of the millimeter wave device based on micro movement (vibration) of the face using the deep learning. The electronic device 101 may identify a matching score by matching the phase, TOF, and/or amplitude values of the reflected waves received at the millimeter wave device with the trained liveness template, and detect the face liveness based on the identified matching score. If detecting no face liveness (determining false), the electronic device 101 may determine face recognition failure and finish the recognition.

If detecting the face liveness (determining true), the electronic device 101 may identify whether there is additional position information (position information (pixel coordinates) for the face recognition)) for the face recognition in operation 725. For example, the memory may store the liveness template and the face recognition template, and the electronic device 101 may determine the landmarks for the liveness detection and the face recognition in operation 715. In operation 725, the electronic device 101 may calculate the azimuth and the elevation for a designated position of the face image for the face recognition. For example, the electronic device 101 may calculate the azimuth and the elevation of the beams for the face recognition by applying the face recognition position information to Equation 1 and Equation 2. In operation 727, the electronic device 101 may transmit a sequence of beams to the face recognition position of the subject based on the calculated azimuth and elevation. In operation 729, the electronic device 101 may receive sequence reflected waves of the beams reflected by the subject. In operation 731, the electronic device 101 may calculate the phase, TOF, and amplitude values from the received reflected waves, and perform the face recognition by matching the calculated values to the face recognition template.

Figure 8:
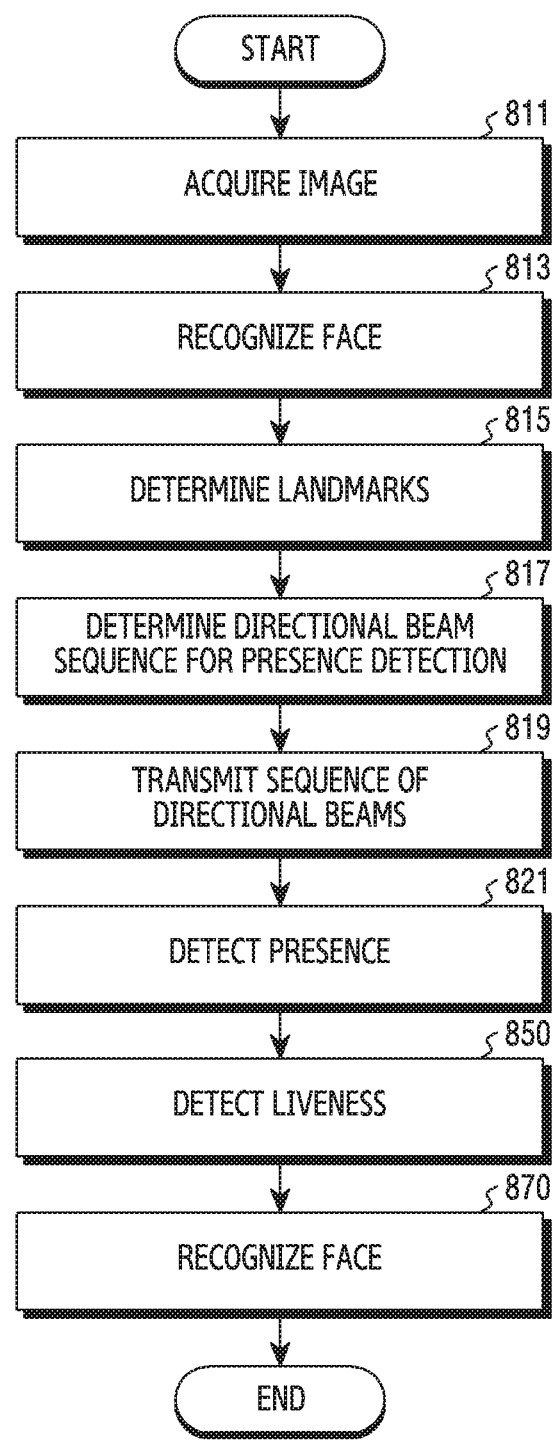
FIG. 8 is a flowchart of a method for recognizing a face in an electronic device according to embodiment of the disclosure.

FIG. 8 is a flowchart of a method for recognizing a face in an electronic device according to embodiment of the disclosure.

Referring to FIG. 8, the electronic device 101 may perform the face recognition based on a face image and a millimeter wave image based on a signal reflected by the face. In operation 811, the electronic device 101 may obtain the image including the face through a camera module (e.g., the camera module 180 of FIG. 1, the camera module 320 of FIG. 2 and FIG. 3). In operation 813, the electronic device 101 may recognize a face region and main portions of the face in the obtained image. In operation 815, the electronic device 101 may detect landmarks for the face recognition in the recognized face image. The electronic device 101 may calculate coordinates of the face region or positions (e.g., pixel coordinates) of the portions which may be the facial landmarks, in the image obtained through the camera module. In operation 815, the electronic device 101 may distinguish and select a set of a position for the presence detection, a position for the face liveness detection and/or a position for the face recognition. For example, the number of the sets (pixel coordinates) may increase in order of the position for the presence detection, the position for the face liveness detection, and the position for the face recognition. For example, the position for the presence detection may use center coordinates of the recognized face image, the position for the face liveness detection may select specific portions which may be the facial landmarks of the eye, the noise, and the lips in the face image, and the position for the face recognition may select a set of all coordinates collected from the whole face image within a limited time duration.

In operation 817, the electronic device 101 may calculate the azimuth and the elevation of corresponding beams for the position for the presence detection by applying Equation 1 and Equation 2. In operation 819, the electronic device 101 may transmit a sequence of directional beams to the subject by forming the beams based on the calculated azimuth and elevation. In operation 821, the electronic device 101 may receive reflected waves of the sequence of the beams reflected by the subject, and identify whether the subject exists within a distance range which is set based on the phase and/or the TOF value of the received reflected waves. In so doing, if the subject is closer to or farther from a distance (e.g., 20 cm) to the subject which is assumed, the electronic device 101 may re-calculate the scales A and B. If there is no subject in the set distance range in the reflected wave information, the electronic device 101 may recognize the face image back in operation 811 and re-calculate the coordinates of the face region in the recognized face image.

If detecting the face presence, the electronic device 101 may detect the face liveness in operation 850. Operation 850 of detecting the liveness may be conducted in the same manner as operation 717 through operation 723 of FIG. 7. If detecting the face liveness, the electronic device 101 may perform the face recognition in operation 870. Operation 870 of recognizing the face may be conducted in the same manner as operation 725 through operation 731 of FIG. 7.

According to various embodiments, a method for recognizing an object in an electronic device 101 may include obtaining at least one image using an image sensor, recognizing an object in the image, transmitting a sequence of one or more directional beams in a direction of the object, using an antenna array disposed in a housing and/or in part of the housing, receiving a sequence of reflected waves reflected by the object, using the antenna array, and recognizing the object, based at least in part on the recognized object and the sequence of the reflected waves.

According to various embodiments, the sequence of the directional beams may be transmitted in frequencies of 3 GHz through 100 GHz.

According to various embodiments, the object may include a face of a user.

According to various embodiments, transmitting the sequence of the directional beams may further include determining a direction of the sequence of the beams, based at least in part on the recognized object or a selected portion of the recognized object.

According to various embodiments, the object recognition method of the electronic device 101 may store a reference image and a reference profile of the object based on the user. Recognizing the object may perform the recognition by comparing the recognized object and a profile detected by the sequence of the reflected waves with the reference image and the reference profile.

According to various embodiments, the object recognition method of the electronic device 101 may further include performing the recognition while the electronic device is locked, and if the recognition is successful, switching the lock state of the electronic device to an unlock state.

According to various embodiments, a method for recognizing a face in an electronic device may include obtaining at least one image using an image sensor, recognizing a face image in the image, setting a liveness detection position of the face and a recognition position of the face based on the face image, transmitting a sequence of first directional beams to the liveness detection position, receiving a sequence of first reflected waves reflected at the liveness detection position, and detecting the liveness based on the sequence of the first reflected waves received, and transmitting a sequence of second directional beams to the recognition position of the face, receiving a sequence of second reflected waves reflected at the face recognition position, and recognizing the face based on the sequence of the second reflected waves received.

According to various embodiments, setting the liveness detection position may set coordinates of pixels based on at least one feature among eyes, noise, and lips of the face, as the liveness detection position. Setting the face recognition position may set coordinates of pixels based on the face portion or part of the face portion, as the face recognition position.

According to various embodiments, detecting the liveness may include setting the sequence of the first directional beams by calculating an azimuth and an elevation for the liveness detection position, transmitting the sequence of the first directional beams, receiving the sequence of the beams reflected by the face, calculating a TOF of the reflected wave based on the sequence of the reflected waves received, and detecting the liveness based on the TOF of the reflected wave and a trained liveness template which is stored.

According to various embodiments, recognizing the face may include setting the sequence of the second directional beams by calculating an azimuth and an elevation for the face recognition position, transmitting the sequence of the second directional beams, receiving the sequence of the beams reflected by the face, calculating a TOF of the reflected wave based on the sequence of the reflected waves received, and recognizing the face based on the TOF of the reflected wave and a face recognition template which is stored.

According to various embodiments, the object recognition method of the electronic device may further include detecting face presence. Detecting the presence may include setting pixel coordinates of a center position of the face, as a presence detection position, setting a direction of sequences of beams by calculating an azimuth and an elevation for the presence detection position, transmitting the sequence of the set directional beams, receiving the sequence of the beams reflected by the face, calculating a TOF of the reflected wave based on the sequence of the reflected waves received, and detecting the presence based on the TOF of the reflected wave and a presence template which is stored.

An electronic device according to various embodiments may perform the object recognition using the wireless communication function in the object recognition. The electronic device may detect the liveness of the object image obtained at the camera using the wireless communication device, recognize the object image of the detected liveness, and thus block a malicious recognition attempt (e.g., spoofing attack). Further, the electronic device may select the beamforming pixels of the millimeter wave device using the object image obtained at the camera (e.g., form the beams in a direction corresponding to some pixels of the image), and shorten the millimeter wave image data generation time through the recognition based on the selected beamforming pixels.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
    a housing comprising a first plate which faces a first direction, a second plate which faces away from the first plate, and a side member which surrounds a space between the first plate and the second plate;
    an antenna array;
    an image sensor disposed to face the first direction;
    a wireless communication circuit electrically coupled to the antenna array and configured to form a directional beam using the antenna array;
    a processor coupled with the image sensor and the wireless communication circuit; and
    a memory operably coupled to the processor,
    wherein the memory stores instructions, when executed, causing the processor to:
        obtain at least one image using the image sensor,
        recognize an object in the at least one image,
        calculate coordinates for transmission of directional beams having a first sequence based on the recognized object in the at least one image,
        transmit the directional beams having the first sequence in at least one second direction using the calculated coordinates, via the antenna array,
        receive reflected waves having a second sequence and reflected by the object, via the antenna array,
        recognize a presence of the object based on the recognized object in the at least one image and amplitude patterns of the reflected waves corresponding to the object,
        transmit directional beams having the first sequence in the at least one second direction using the calculated coordinates via the antenna array for detecting liveness,
        receive reflected waves having the second sequence and reflected by the object via the antenna array, and
        recognize the liveness of the object based on the reflected waves for detecting the liveness, and
    wherein recognition of the liveness of the object comprises detecting micromovement of a specific portion of a face of a user.

2. The electronic device of claim 1, wherein the wireless communication circuit is configured to transmit or receive frequencies of 3 GHz through 100 GHz.

3. The electronic device of claim 1, wherein the at least one second direction is a same direction as the first direction.

4. The electronic device of claim 1,
    wherein the memory stores a reference image and a reference profile of the object based on a user, and
    wherein the instructions further cause to perform recognition by comparing the recognized object and a profile detected by the reflected waves having the second sequence with the reference image and the reference profile.

5. The electronic device of claim 1, wherein the instructions further cause the processor to determine a distance between the object and the electronic device, based on the reflected waves having the second sequence.

6. The electronic device of claim 1, wherein the instructions further cause the processor to:
    perform recognition while the electronic device is locked, and
    if the recognition is successful, switch a lock state of the electronic device to an unlock state.

7. A method for recognizing an object in an electronic device, the method comprising:
    obtaining at least one image using an image sensor;
    recognizing an object in the at least one image;
    calculating coordinates for transmission of directional beams having a first sequence based on the recognized object in the at least one image;

transmitting directional beams having the first sequence in at least one direction using the calculated coordinates, via an antenna array;
receiving reflected waves having a second sequence and reflected by the object, via the antenna array; and
recognizing a presence of the object based on the recognized object in the at least one image and amplitude patterns of the reflected waves corresponding to the object;
transmitting directional beams having the first sequence in the at least one send direction using the calculated coordinates via the antenna array for detecting liveness;
receiving reflected waves having the second sequence and reflected by the object via the antenna array; and
recognizing the liveness of the object based on the reflected waves for detecting the liveness,
wherein the recognizing of the liveness of the object comprises detecting micromovement of a specific portion of a face of a user.

8. The method of claim 7, wherein the directional beams having the first sequence is transmitted in frequencies of 3 GHz through 100 GHz.

9. The method of claimer 7,
wherein a memory of the electronic device stores a reference image and a reference profile of the object based on the user, and
wherein the recognizing of the presence of the object comprises performing recognition by comparing the recognized object and a profile detected by the reflected waves having the second sequence with the reference image and the reference profile.

10. The method of claim 7, further comprising:
performing recognition while the electronic device is locked; and
if the recognition is successful, switching a lock state of the electronic device to an unlock state.

11. The method of claim 7,
wherein the recognition of the object is performed using three separate models including a presence model, a liveness model, and a face recognition model,
wherein the presence model and the liveness model are configured to be used for a plurality of users, and
wherein the face recognition model is unique to a specific user.

12. The method of claim 7,
wherein movement of the face causes fluctuation in at least one of a phase value or a TOF value, and
wherein characteristics of the movement are prestored in a specific pattern.

* * * * *